(12) United States Patent
MacDonald et al.

(10) Patent No.: US 8,233,632 B1
(45) Date of Patent: **\*Jul. 31, 2012**

(54) METHOD AND APPARATUS FOR MULTI-CHANNEL AUDIO PROCESSING USING SINGLE-CHANNEL COMPONENTS

(75) Inventors: Andrew John MacDonald, San Francisco, CA (US); Jan Skoglund, San Francisco, CA (US); Björn Volcker, Bromma (SE)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,816

(22) Filed: Sep. 26, 2011

Related U.S. Application Data

(63) Continuation of application No. 13/112,958, filed on May 20, 2011.

(51) Int. Cl.
*H03B 29/00* (2006.01)
*H04M 9/08* (2006.01)
*H04B 3/20* (2006.01)

(52) U.S. Cl. ... 381/71.1; 381/66; 381/71.2; 379/406.01; 379/406.06

(58) Field of Classification Search ............... 381/66, 381/71.1–71.14, 94.1, 80, 1, 17–19; 379/406.01–406.16

See application file for complete search history.

(56) References Cited

U.S. PATENT DOCUMENTS

| | | | |
|---|---|---|---|
| 7,043,013 B2 * | 5/2006 | Le Tourneur et al. | 379/406.04 |
| 2009/0316923 A1 * | 12/2009 | Tashev et al. | 381/66 |
| 2010/0074433 A1 * | 3/2010 | Zhang et al. | 379/406.08 |

\* cited by examiner

*Primary Examiner* — Devona Faulk
(74) *Attorney, Agent, or Firm* — Birch, Stewart, Kolasch & Birch, LLP

(57) ABSTRACT

Processing multi-channel audio streams using one or more arrangements of single-channel components. Components that only process the near-end, or capture stream, such as noise suppression (NS) components, are limited in how they can be suitably arranged for processing multi-channel streams. However, components that process the near-end stream using one or more inputs from the far-end, or render stream, such as acoustic echo cancellation (AEC) and automatic gain control (AGC) components, are arranged in one or more of the ways suitable for use with multiple channels.

11 Claims, 5 Drawing Sheets

US 8,233,632 B1

METHOD AND APPARATUS FOR MULTI-CHANNEL AUDIO PROCESSING USING SINGLE-CHANNEL COMPONENTS

This application is a continuation of co-pending application Ser. No. 13/112,958, filed May 20, 2011, the entire contents of which are hereby incorporated by reference and for which priority is claimed under 35 U.S.C. §120.

FIELD OF THE INVENTION

The present disclosure generally relates to systems and methods for transmission of audio signals such as voice communications. More specifically, aspects of the present disclosure relate to multi-channel audio signal processing using components designed for single-channel processing.

BACKGROUND

As a result of CPU gains and increased production of multi-channel consumer microphones, it is now feasible to handle multi-channel audio streams on non-dedicated devices that have traditionally used mono audio streams. Although certain dedicated devices, such as high-end conference telephones and video conferencing installations, have used multi-channel audio processing for some time, they have typically done so using specially-designed multi-channel components. The prevalence of multi-channel processing in non-dedicated devices is less clear. Accordingly, there is a need for low-complexity processing of multi-channel audio streams using traditional single-channel components, including acoustic echo control (AEC), automatic gain control (AGC), and noise suppression (NS).

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for processing multi-channel audio streams comprising: receiving at a first single-channel audio component located at a near-end channel of an audio signal transmission path, signal-processing input from a first far-end channel of the signal transmission path, the first single-channel audio component being one of a group of first single-channel audio components each located at a different near-end channel of the signal transmission path and each receiving the signal-processing input from the first far-end channel; processing an audio signal at the first single-channel audio component using the signal-processing input from the first far-end channel; sending the processed audio signal from the first single-channel audio component to a second single-channel audio component located at the near-end channel, the second single-channel audio component being one of a group of second single-channel audio components each located at a different near-end channel of the signal transmission path and each receiving signal-processing input from a second far-end channel of the signal transmission path.

Another embodiment of the disclosure relates to a system for processing multi-channel audio streams comprising: a group of first single-channel audio components each located at a different near-end channel of an audio signal transmission path; and a group of second single-channel audio components each located at a different near-end channel of the signal transmission path, wherein each of the first single-channel audio components is configured to receive, at a near-end channel, signal-processing input from a first far-end channel of the signal transmission path, process an audio signal using the signal-processing input from the first far-end channel, and send the processed audio signal to a second single-channel audio component located at the near-end channel, and wherein the second single-channel audio component is configured to receive signal-processing input from a second far-end channel of the signal transmission path.

In other embodiments of the disclosure, the methods and systems described herein may optionally include one or more of the following additional features: the signal-processing input received is a combination of signal-processing inputs from the first and second far-end channels, the combination of signal-processing inputs is an average of the signal-processing inputs from the first and second far-end channels, the group of first single-channel components and the group of second single-channel components are each a group of echo control components, and the group of first single-channel components and the group of second single-channel components are each a group of automatic gain control components.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
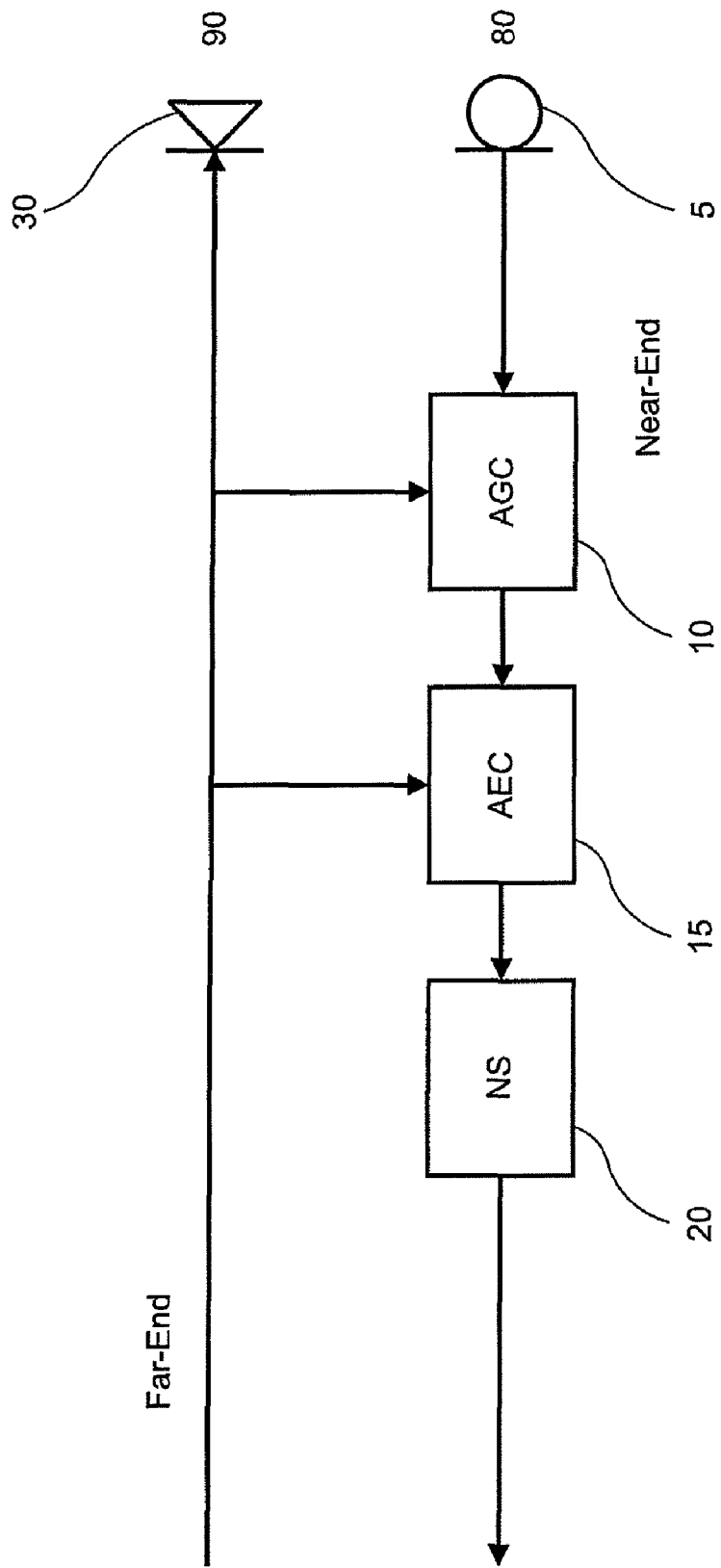
FIG. 1 is a block diagram showing an example audio communications environment in which one or more embodiments described herein may be implemented.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to processing multi-channel audio streams using one or more arrangements of single-channel components. As used herein, a "single-channel component" may refer to a component in which all input and output streams (e.g., signals, signal streams, etc.) contain a single audio channel or, equivalently, are mono. For example, a mono acoustic echo control (AEC) component receives mono far-end and near-end streams as input, and produces a mono output stream. In comparison, a "multi-channel component" may refer to a component in which any of the input or output streams contains more than one channel. Components that only process the near-end, or capture stream, such as noise suppression (NS) components, are limited in how they can be suitably arranged for processing multi-channel streams. However, components that process the near-end stream using one or more inputs (e.g., signal characteristics, measurements, processing information, etc.) from the far-end, or render stream, such as acoustic echo control (AEC) and automatic gain control (AGC) components, may be arranged in one or more of the ways described herein.

FIG. 1 illustrates a single-channel processing environment showing example components that may be implemented in one or more embodiments described herein. As shown, near-end signal transmission channel 80 includes capture device 5, AGC component 10, AEC component 15, and NS component 20, while far-end signal transmission channel 90 includes a render device 30.

Capture device 5 may be any of a variety of audio input devices, such as one or more microphones configured to capture sound and generate input signals. Render device 30 may be any of a variety of audio output devices, including a loudspeaker or group of loudspeakers configured to output sound from one or more channels. For example, capture device 5 and render device 30 may be hardware devices internal to a computer system, or external peripheral devices connected to a computer system via wired and/or wireless connections. In some arrangements, capture device 5 and render device 30 may be components of a single device, such as a speakerphone, telephone handset, etc. Additionally, one or both of capture device 5 and render device 30 may include analog-to-digital and/or digital-to-analog transformation functionalities.

FIG. 1 also shows AGC component 10, AEC component 15, and NS component 20. NS component 20 may be a noise suppression system or noise suppressor component of a system designed to increase a signal-to-noise ratio (SNR) of an incoming audio signal. In one example, NS component 20 may be configured to remove all noise present in a received signal while minimizing effects on speech also present in the signal. Accordingly, NS component 20 may be configured to determine an appropriate balance between desirable noise reduction and acceptable speech distortion.

FIG. 1 also shows AGC component 10 and AEC component 15, one or both of which may be included in either of the arrangements illustrated in FIGS. 2 and 3, described in greater detail below. AEC component 15 may include various types of acoustic echo control systems, modules, components, etc., including acoustic echo cancellers and suppressors. Similarly, AGC component 10 may include various types of automatic gain controllers, or gain control systems or components. For example, AGC component 10 may be configured to bring an audio signal level within an appropriate range prior to echo cancellation/suppression (e.g., by AEC component 15). AGC component 10 may operate in two separate stages, analog and digital, or alternatively, AGC component 10 may operate as only analog or digital.

In at least one example, AEC component 15 may be an acoustic echo canceller or suppressor configured to cancel or suppress acoustic echo for voice and audio communication. Such voice and audio communication may be, for example, over packet-switched networks. Additionally, AEC component 15 may be configured to operate on a signal (e.g., cancel or suppress echo in the signal) in time-domain or frequency-domain. AEC component 15 may be located in end-user equipment, including a computer system, wired or wireless telephone, voice recorder, and the like.

As shown in FIG. 1, single-channel components such as AGC component 10 and AEC component 15 receive inputs (e.g., signal measurements, information, etc.) from the far-end stream when performing processing on the near-end stream. For example, both AGC component 10 and AEC component 15 may receive both the far-end and near-end signals as input. AGC component 10 may also receive, at the near-end, the volume level of the capture device. Additionally, AEC component 15 may receive a value corresponding to the delay introduced by an operation system (OS) and underlying hardware at both the far-end and near-end environments. In at least some arrangements, this delay may be supplied to AEC component 15 as the sum of both the far-end and near-end delays, along with the near-end signal. In still further arrangements, AEC component 15 may also receive clock-drift information from the far-end and near-end that AEC component 15 uses to calculate any clock drift that may be present. Other single-channel components, such as NS component 20, may not receive inputs from the far-end when processing the near-end stream. It should be understood that other single-channel components may also be used in the arrangements described herein in addition to or instead of AGC and AEC components.

Figure 2:
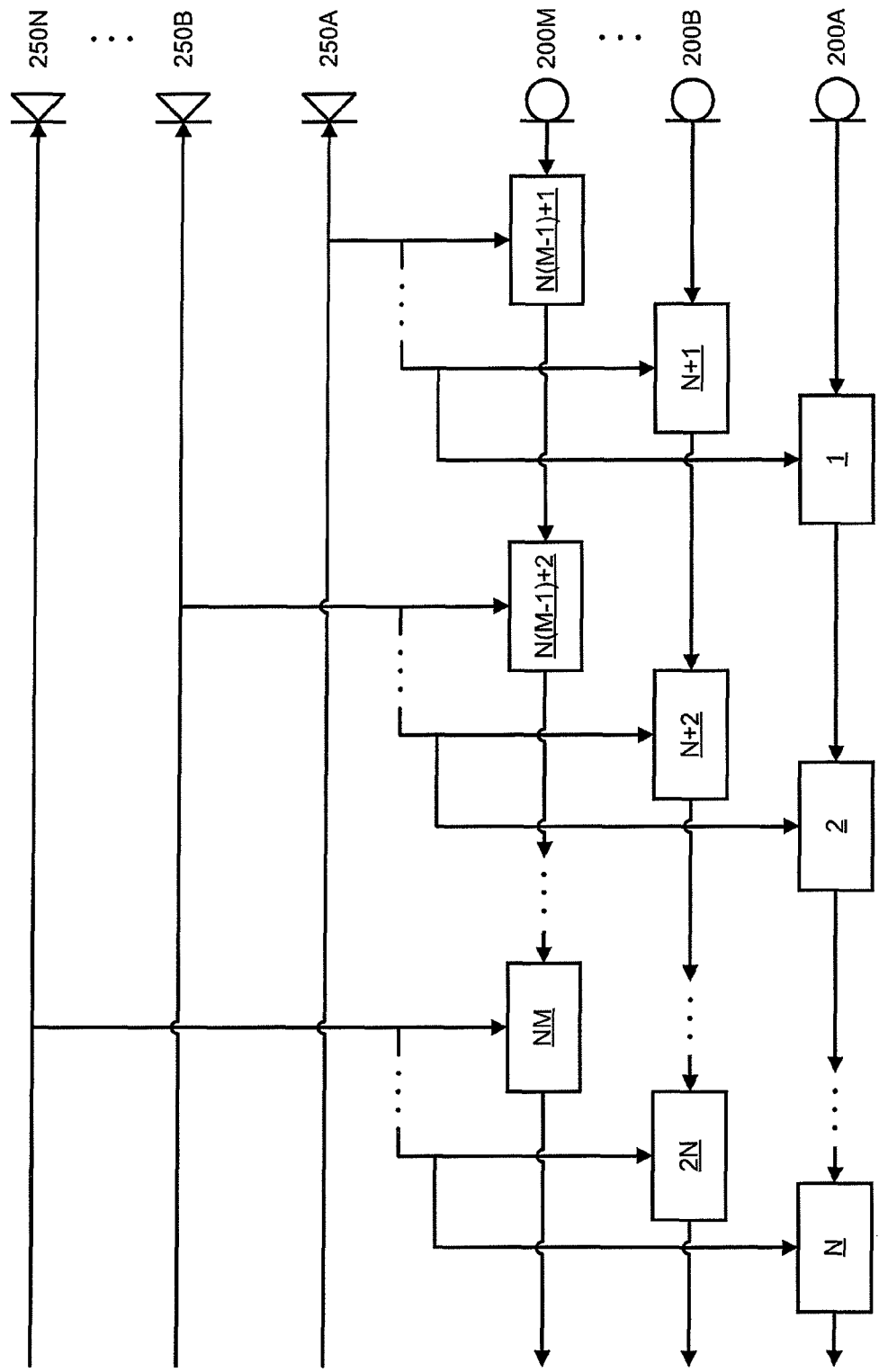
FIG. 2 is a functional block diagram showing an arrangement of audio processing components according to one or more embodiments described herein.

FIG. 2 illustrates an arrangement of components according to one or more embodiments described herein. The arrangement includes a near-end environment comprising near-end channels 200A, 200B, up through 200M (where "M" is an arbitrary number), and a far-end environment comprising far-end channels 250A, 250B, up through 250N (where "N" is an arbitrary number). In FIG. 2, single-channel components are indicated as sequentially-numbered blocks. For example, near-end channel 200A includes component 1, component 2, up through component N (where "N" corresponds to the arbitrary number of far-end channels).

The arrangement illustrated includes one single-channel component for each far-end/near-end channel combination, for a total of N*M components, as indicated by component NM. As shown, each of first components 1, N+1, up through N(M−1)+1 of near-end channels 200A, 200B, up through 200M, respectively, receive render stream input (e.g., signal-processing information) from far-end channel 250A. Similarly, each of second components 2, N+2, up through N(M−1)+2 of near-end channels 200A, 200B, up through 200M, respectively, receive render stream input from far-end channel 250B. Additional groups of single-channel near-end components receive far-end channel input in this manner, including final components N, 2N, up through NM of near-end channels 200A, 200B, and 200M, respectively, receiving render stream input from far-end channel 250N.

In some embodiments, the arrangement shown in FIG. 2 may be used for AEC components. Acoustic echo is generated when the far-end render device (e.g., render device 60 shown in FIG. 1) signal is picked up by the capture device (e.g., capture device 5 shown in FIG. 1) as part of the near-end signal and sent back to a remote client (e.g., user, customer, etc.) for rendering. The remote client may perceive this rendered signal as echo. AEC components remove this echo while affecting the real near-end speech as little as possible. In at least some arrangements, AEC components accomplish this by having access to the far-end signal before the signal is played out by the render device.

Figure 3:
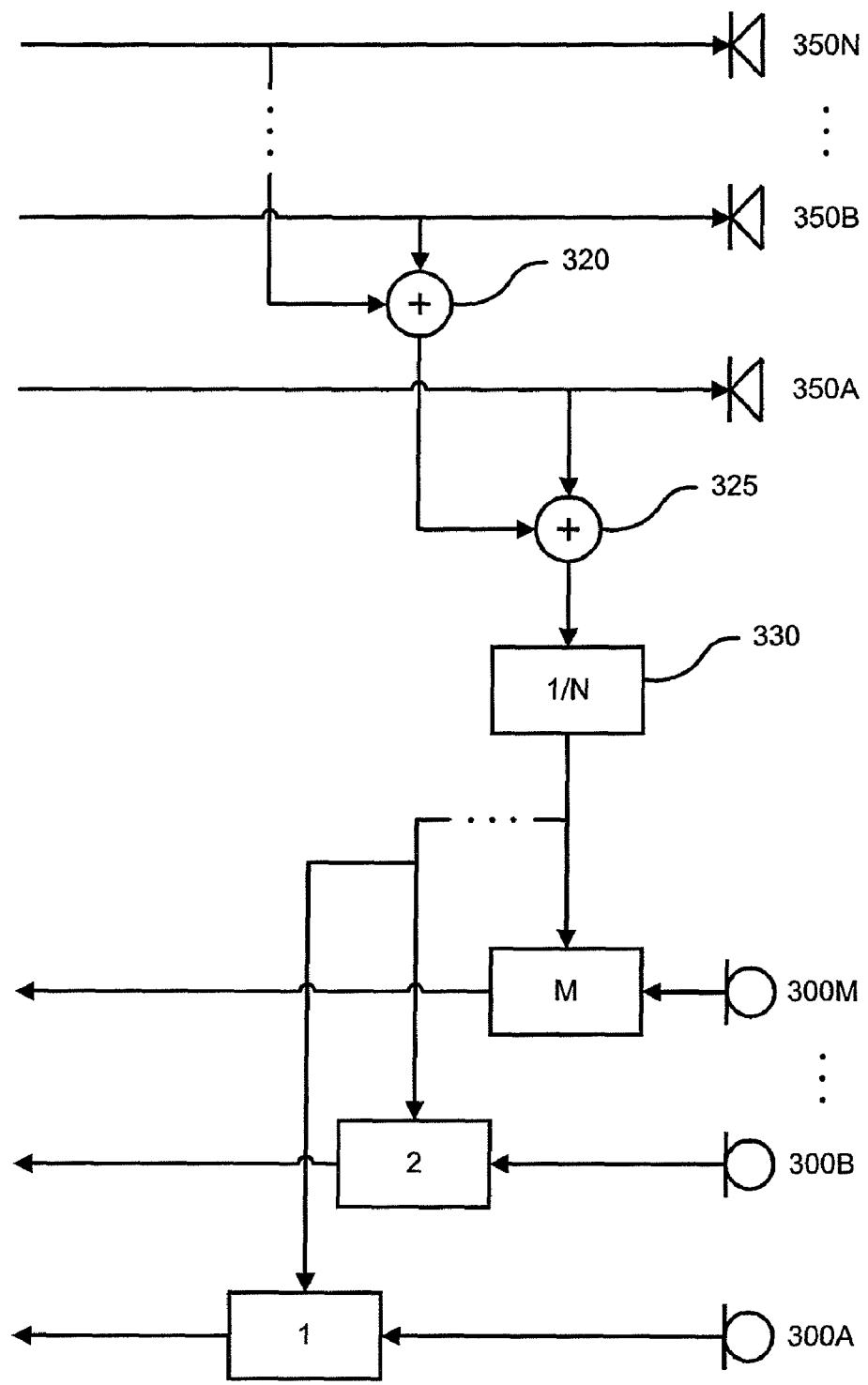
FIG. 3 is a functional block diagram showing an arrangement of audio processing components according to one or more embodiments described herein.

FIG. 3 illustrates another arrangement of components according to one or more embodiments described herein. This arrangement includes a near-end environment comprising near-end channels 300A, 300B, up through 300M (where "M" is an arbitrary number), and a far-end environment comprising far-end channels 350A, 350B, up through 350N (where "N" is an arbitrary number). In FIG. 3, single-channel components are indicated as sequentially-numbered blocks. For example, near-end channels 300A, 300B, up through 300M include component 1, component 2, up through component M, respectively (where "M" corresponds to the arbitrary number of near-end channels).

In the arrangement illustrated in FIG. 3, independent signal-processing information is not input to the single-channel near-end components 1, 2, up through M, from each of the far-end channels 350A, 350B, up through 350N. Instead, signal-processing information from each far-end channel is summed, as indicated by summation points 320 and 325, and then combined (e.g., averaged) as indicated by combination block 330. The combined signal-processing information obtained from the far-end channels in combination block 330 is then passed to each of the single-channel components 1, 2, up through M of near-end channels 300A, 300B, up through 300M, respectively. In at least some embodiments, the signal-processing information from all of the far-end channels is averaged in combination block 330, while in other embodiments different mathematical operations may be performed on the signal-processing information in combination block 330 before being passed to each of the single-channel components at the near-end channels.

In some embodiments, the arrangement shown in FIG. 3 may be used for AGC components and/or reduced-complexity AEC components. For example, AGC components, which are used to ensure that signal levels are in an appropriate range, may be configured to operate using two main processing steps. In the first step, the signal is detected, and in the second step the gain adjusted accordingly. In at least one example, AGC components may adjust the gain only when speech is found to be present in the input signal, thereby preventing amplification of any background noise. Additionally, in one or more other embodiments, reduced-complexity AEC components may be used in the arrangement of FIG. 3.

In at least some embodiments, the arrangements shown in FIGS. 2 and 3 include single-channel components of one type. For example, referring to FIG. 2, first components 1, N+1, up through N(M−1)+1 of near-end channels 200A, 200B, up through 200M, second components 2, N+2, up through N(M−1)+2 of near-end channels 200A, 200B, up through 200M, and so on, may all be single-channel AEC components. In some embodiments, all of these components may instead be single-channel AGC components. Similarly, referring to FIG. 3, component 1, component 2, up through component M of near-end channels 300A, 300B, up through 300M may all be single-channel AEC components or single-channel AGC components, depending on the particular arrangement being implemented. As will be described in greater detail below, some embodiments of the disclosure may include either of the arrangements shown in FIGS. 2 and 3, or a combination of these arrangements, where multiple types of single-channel components are included along each near-end channel.

Figure 4:
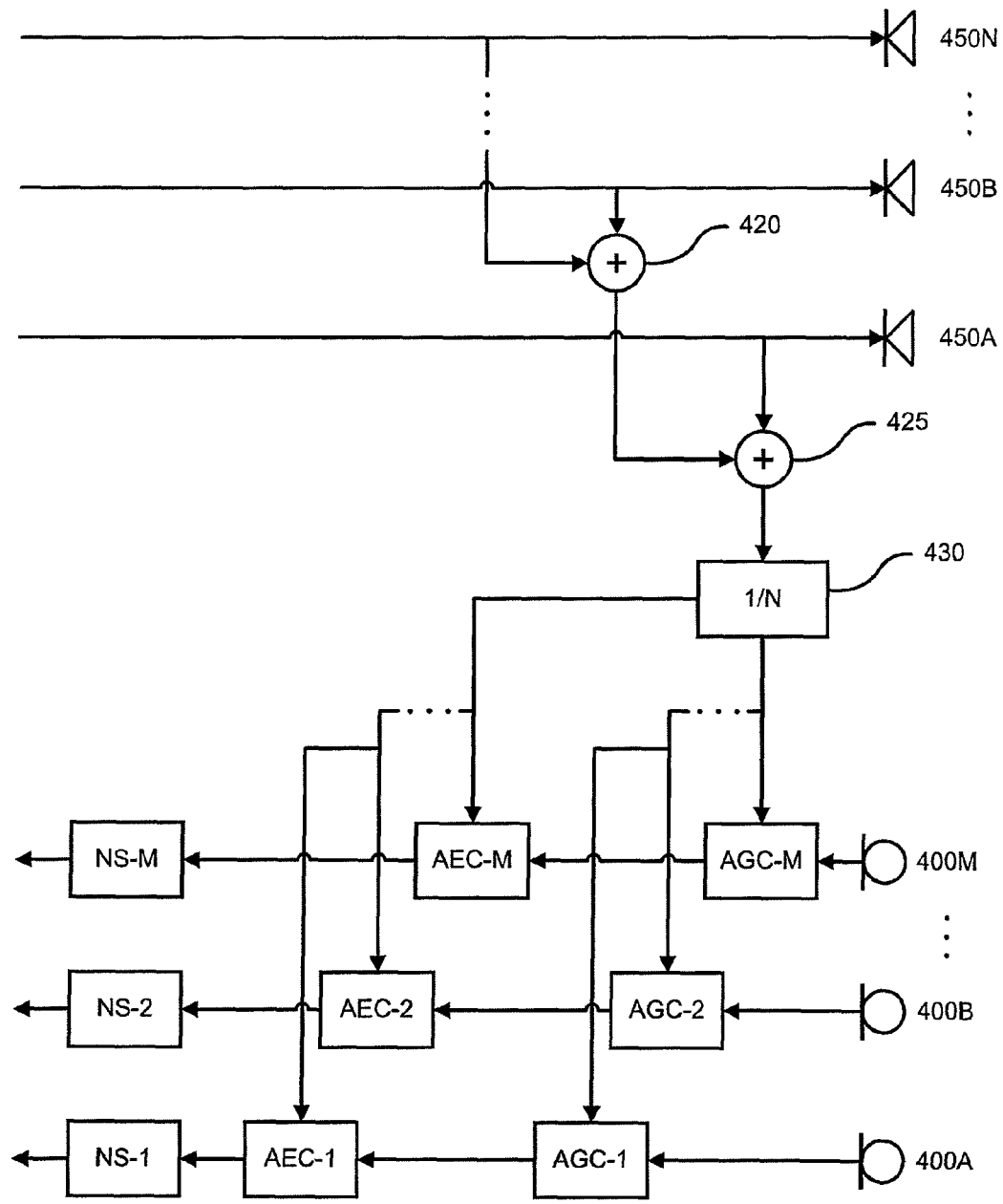
FIG. 4 is a functional block diagram showing an arrangement of exemplary audio processing components according to one or more embodiments described herein.

FIG. 4 illustrates an example arrangement of different single-channel components according to one or more embodiments of the disclosure. This arrangement includes a near-end environment comprising near-end channels 400A, 400B, up through 400M (where "M" is an arbitrary number), and a far-end environment comprising far-end channels 450A, 450B, up through 450N (where "N" is an arbitrary number). The arrangement shown in FIG. 4 includes examples of different single-channel components along each of the near-end channels 400A, 400B, up through 400M such that multiple types of audio processing (e.g., echo control, automatic gain control, noise suppression, etc.) may be performed. The single-channel components in the arrangement shown include, for each near-end channel, an AGC component, AEC component and NS component. For example, near-end channel 400A includes single-channel components AGC-1, AEC-1, and NS-1, while near-end channel 400B includes AGC-2, AEC-2, and NS-2, and so on up through near-end channel 400M, which includes single-channel components AGC-M, AEC-M, and NS-M (where "M" corresponds to the arbitrary number of near-end channels).

In the arrangement illustrated in FIG. 4, independent signal-processing information is not input to the single-channel near-end components from each of the far-end channels 450A, 450B, up through 450N. Instead, similar to the arrangement shown in FIG. 3 and described above, in the arrangement shown in FIG. 4, signal-processing information from each far-end channel is summed, as indicated by summation points 420 and 425, and then combined (e.g., averaged) as indicated by combination block 430. The combined signal-processing information obtained from the far-end channels in combination block 430 is then passed to each of the different types of single-channel components of near-end channels 400A, 400B, up through 400M that receive far-end input when performing their respective processing. For example, the combined signal-processing information from combination block 430 may be passed to components AGC-1 and AEC-1 of near-end channel 400A, components AGC-2 and AEC-2 of near-end channel 400B, and so on, while such signal-processing information is not passed to components NS-1, NS-2, up through NS-M.

In at least some embodiments, the signal-processing information from all of the far-end channels shown in the arrangement of FIG. 4 is averaged in combination block 430, while in other embodiments different mathematical operations may be performed on the signal-processing information in combination block 430 before being passed to the single-channel components at the near-end channels. Additionally, the combined signal-processing information passed from combination block 430 to the different types of single-channel components at the near-end channels may be specific to each component type. For example, combined signal-processing information passed from combination block 430 to AGC-1, AGC-2, up through AGC-M may include only signal information, while the combined signal-processing information passed from combination block 430 to AEC-1, AEC-2, up through AEC-M may include both signal information as well as delay information (e.g., information related to delay introduced by an operating system (OS) and any underlying hardware at both the near-end and far-end environments).

Figure 5:
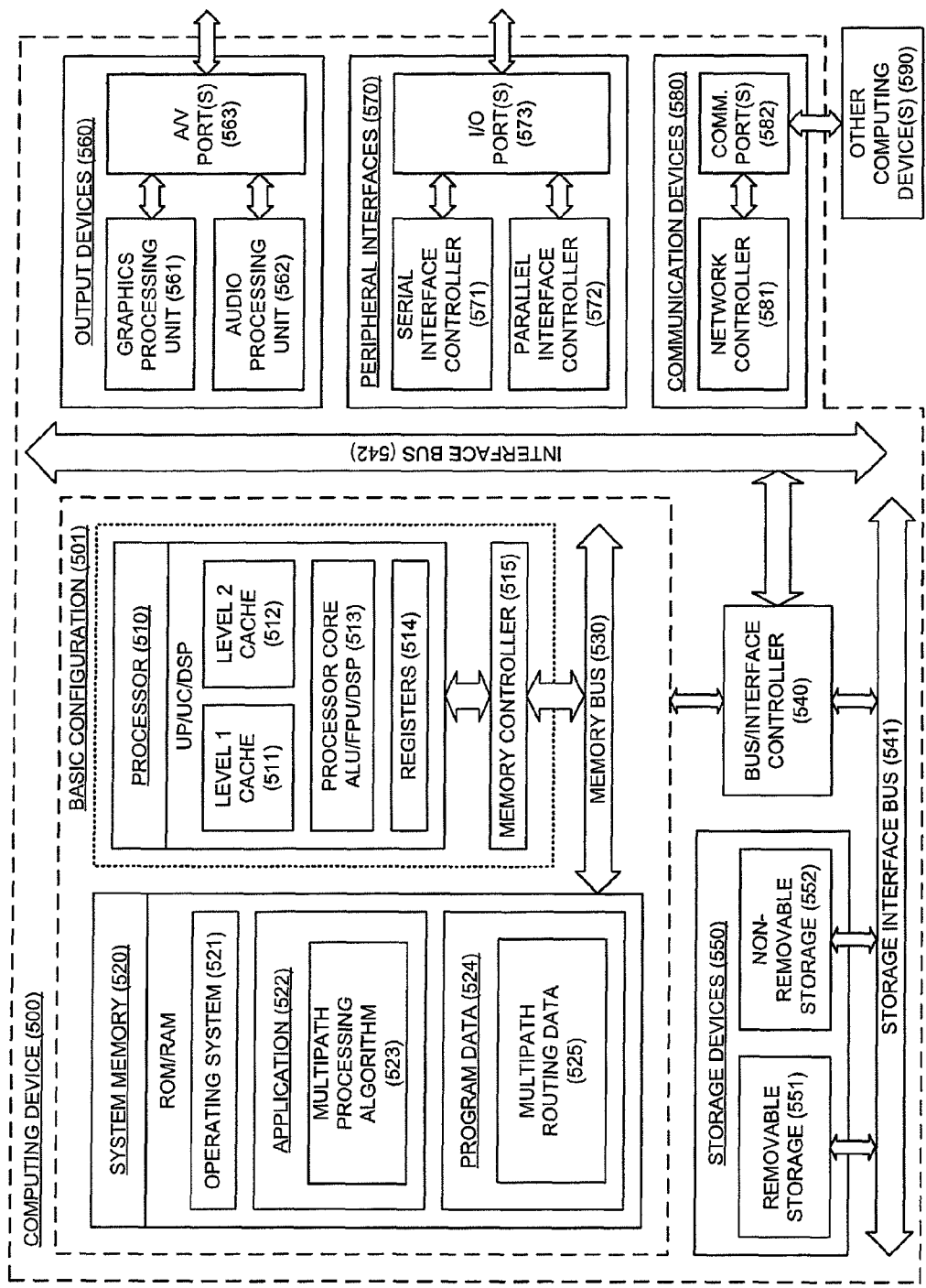
FIG. 5 is a block diagram illustrating an example computing device arranged for multipath routing and processing of audio input signals according to one or more embodiments described herein.

FIG. 5 is a block diagram illustrating an example computing device 500 that is arranged for multipath routing in accordance with one or more embodiments of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 can also be used with the processor 510, or in some embodiments the memory controller 515 can be an internal part of the processor 510.

Depending on the desired configuration, the system memory 520 can be of any type including but not limited to volatile memory (e.g., RAM), non-volatile memory (e.g., ROM, flash memory, etc.) or any combination thereof. System memory 520 typically includes an operating system 521, one or more applications 522, and program data 524. In at least some embodiments, application 522 includes a multipath processing algorithm 523 that is configured to pass signal-processing information from far-end channels (e.g., far-end channels 250A, 250B, through 250N of FIG. 2) to components of near-end channels (e.g., components 1, N+1, through N(M−1)+1 of near-end channels 200A, 200B, through 200M in FIG. 2). The multipath processing algorithm is further arranged to pass a combination of signal-processing information (e.g., block 330 shown in FIG. 3) from each of a group of far-end channels (e.g., far-end channels 350A, 350B, through 350N shown in FIG. 3) to components of a group of corresponding near-end channels (e.g., components 1, 2, through M of near-end channels 300A, 300B, through 300M shown in FIG. 3).

Program Data 524 may include multipath routing data 525 that is useful for passing signal-processing information along multiple signal pathways to components of near-end channels (e.g., components 1, N+1, through N(M−1)+1 of near-end channels 200A, 200B, through 200M in FIG. 2). In some embodiments, application 522 can be arranged to operate with program data 524 on an operating system 521 such that signal-processing information is combined from a group of far-end channels (e.g., at combination point 325 from far-end channels 350A, 350B, through 350N shown in FIG. 3) before being passed to components of corresponding near-end channels (e.g., components 1, 2, through M of near-end channels 300A, 300B, through 300M shown in FIG. 3).

Computing device 500 can have additional features and/or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of computing device 500.

Computing device 500 can also include an interface bus 542 for facilitating communication from various interface devices (e.g., output interfaces, peripheral interfaces, communication interfaces, etc.) to the basic configuration 501 via the bus/interface controller 540. Example output devices 560 include a graphics processing unit 561 and an audio processing unit 562 (e.g., audio quality unit 225 shown in FIG. 2 or audio quality unit 325 shown in FIG. 3), either or both of which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication (not shown) via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for processing multi-channel audio streams comprising:
   receiving at a first single-channel audio component located at a near-end channel of an audio signal transmission path, signal-processing input from a first far-end channel of the signal transmission path, the first single-channel audio component being one of a group of first single-channel audio components each located at a different near-end channel of the signal transmission path and each receiving the signal-processing input from the first far-end channel;
   processing an audio signal at the first single-channel audio component using the signal-processing input from the first far-end channel; and
   sending the processed audio signal from the first single-channel audio component to a second single-channel audio component located at the near-end channel, the second single-channel audio component being one of a group of second single-channel audio components each located at a different near-end channel of the signal transmission path and each receiving signal-processing input from a second far-end channel of the signal transmission path, wherein the group of first single-channel audio components includes each of the first components of the near-end channels and the group of second single-channel audio components includes each of the second components of the near-end channels.

2. The method of claim 1, further comprising using the signal-processing input from the second far-end channel to further process the audio signal at the second single-channel audio component.

3. The method of claim 1, wherein the group of first single-channel audio components and the group of second single-channel audio components is each a group of echo control components.

4. The method of claim 1, wherein the group of first single-channel audio components and the group of second single-channel audio components is each a group of automatic gain control components.

5. The method of claim 1, further comprising:
   combining the signal-processing input from the first far-end channel and the second far-end channel; and
   sending the combined signal-processing input to the group of first single-channel audio components.

6. The method of claim 5, wherein the combined signal-processing input is an average of the signal-processing input from the first far-end channel and the signal-processing input from second far-end channel.

7. A system for processing multi-channel audio streams comprising:
   a group of first single-channel audio components each located at a different near-end channel of an audio signal transmission path; and
   a group of second single-channel audio components each located at a different near-end channel of the signal transmission path,
   each of the first single-channel audio components configured to:
   receive, at a near-end channel, signal-processing input from a first far-end channel of the signal transmission path,
   process an audio signal using the signal-processing input from the first far-end channel, and
   send the processed audio signal to a second single-channel audio component located at the near-end channel, the second single-channel audio component configured to receive signal-processing input from a second far-end channel of the signal transmission path, wherein the group of first single-channel audio components includes each of the first components of the near-end channels and the group of second single-channel audio components includes each of the second components of the near-end channels.

8. The system of claim 7, wherein each of the first single-channel audio components is further configured to receive a combination of signal-processing inputs from the first far-end channel and the second far-end channel.

9. The system of claim 8, wherein the combination of signal-processing inputs is an average of the signal-processing inputs from the first far-end channel and the second far-end channel.

10. The system of claim 7, wherein the group of first single-channel audio components and the group of second single-channel audio components is each a group of echo control components.

11. The system of claim 7, wherein the group of first single-channel audio components and the group of second single-channel audio components is each a group of automatic gain control components.

* * * * *